(No Model.)
C. P. BAILE.
GREEN CORN SILKER.
No. 287,083. Patented Oct. 23, 1883.
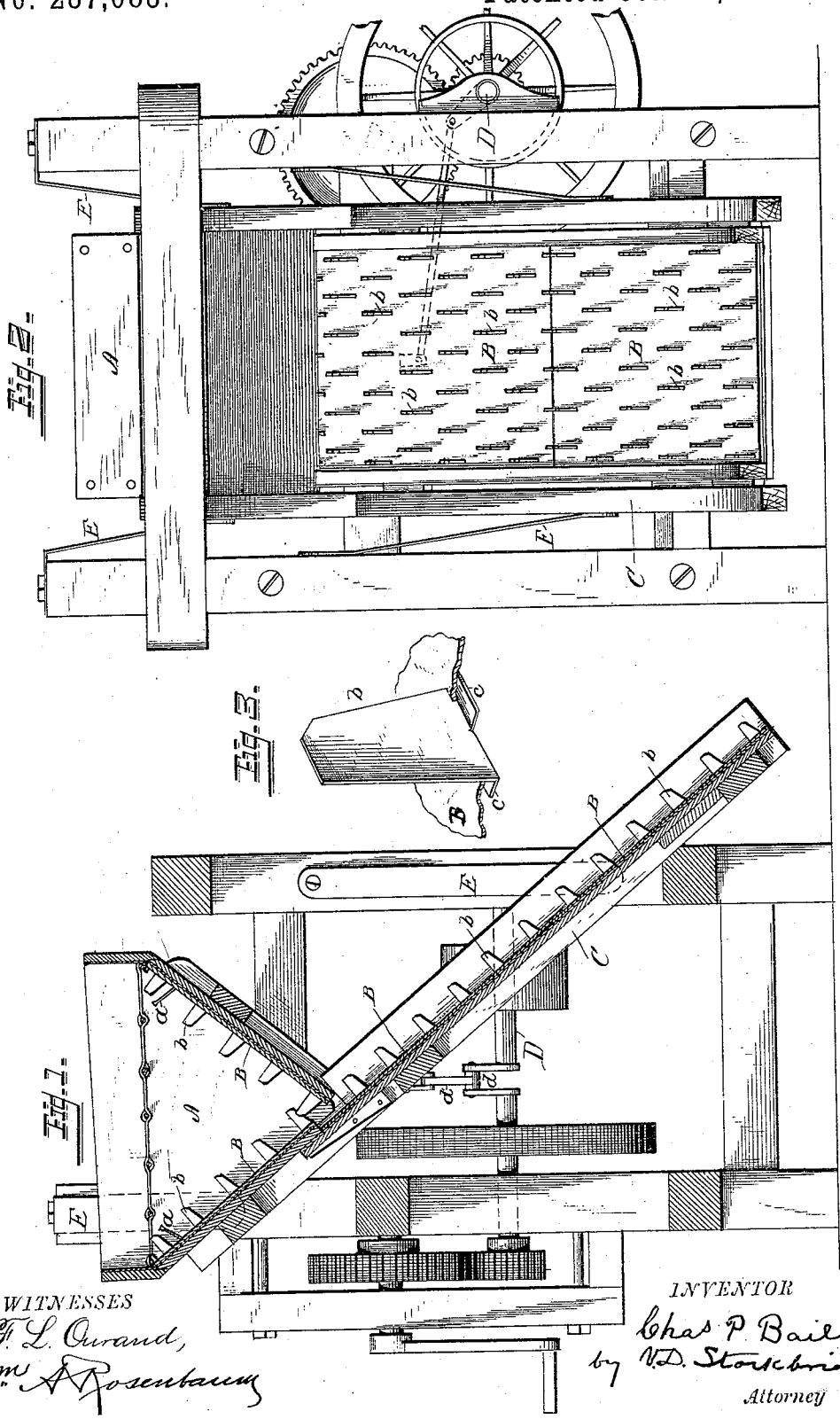
WITNESSES
F. L. Ourand,
Wm. A. Rosenbaum
INVENTOR
Chas. P. Baile.
by V. D. Stockbridge
Attorney

UNITED STATES PATENT OFFICE.

CHARLES P. BAILE, OF NEW WINDSOR, MARYLAND.

GREEN-CORN SILKER.

SPECIFICATION forming part of Letters Patent No. 287,082, dated October 23, 1883.

Application filed August 15, 1883. (No model.)

*To all whom it may concern:*

Be it known that I, CHARLES P. BAILE, of New Windsor, in the county of Carroll and State of Maryland, have invented certain new and useful Improvements in Green-Corn Silkers; and I do hereby declare that the following is a full, clear, and exact description of the invention, such as will enable others skilled in the art to which it appertains to make and use the same.

In machines for separating silk from the grain of green corn hitherto made, so far as known to me, the means of separation consists of an inclined trough or chute having pins projecting therefrom to catch the silk, while it permits the grains of corn to pass between them, the trough and hopper leading thereto being reciprocated or shaken sidewise to cause the flow of the corn. This machine is defective in this, that the silk extends around the pins, and by reason of the shaking motion becomes twisted around the pins, and afterward, by the starchy or glutinous matter, is caused to adhere to the pins, and is difficult to remove by the usual flushing with water. The barbed plate or trough is made removable, so that it may be turned upside down in water, the better to remove the adhering silk; but by reason of the tight twist and the starch it is difficult of removal. Moreover, the machines known to me are made with wooden surfaces, to which the starch adheres and clogs the ready flow of the corn and quickly becomes sour, requiring frequent flushings and scaldings to keep the apparatus sweet and in working order.

The object of my invention is to overcome the objections above referred to, and to provide a cleaner or silker which shall perfectly separate the broken pieces of cob, husks, and silk from the corn, and which will remain sweet for the longest possible time without cleaning, and which is easily cleaned; and to this end my invention consists in the combination, with all the surfaces over which the corn passes, of projecting blades of such width that the silk will not reach around them to meet on the lower side, and of such tapering shape that, even if it should in some instances wind around the blade, it will readily slip off upon being flushed in water with the plate upside down; and it further consists in lining the entire surfaces of the hopper and trough with galvanized or tinned iron or zinc, or other like smooth metal, to prevent saturation by the juices of the corn, and thereby avoid souring, as well as the swelling and shrinkage of the material, and to facilitate cleansing by flushing. In practice a machine should be cleansed and flushed about every three hours, or about four times daily, to keep it in a pure condition, and the plates and blades as often as they become clogged, which in my machine can be observed from the outside.

My invention also consists in certain details of construction and combination of parts, which will be particularly described, and pointed out in the claims.

In the drawings, Figure 1 is a central section of my machine, showing the form of hopper and chute or trough and the removable plates armed with blades, as well as the driving mechanism. Fig. 2 is a front elevation of the machine, showing the open trough and the means for suspending the hopper and trough. Fig. 3 is a view of one of the blades and the manner of connecting it with the removable plate.

A is the hopper, lined, as shown, with metal, and provided near the top, on opposite sides, with pins or hooks $a\ a$, for suspending the removable plates.

B B are removable plates arranged on the inclined sides of the hopper, and provided with blades $b$, of the shape shown. These blades should be about one and one-half inch wide at the base and about one inch wide at the top, the upper corner rounded off, and they should be about three inches long at the upper end of the chute and about two inches long at its lower end. At the lower edge of the removable plates B in the hopper the blades are long enough to cross each other, so that the coarser stuff is kept from reaching the chute. A screen is also arranged within the top of the hopper, to keep therefrom the very coarse material.

C is the trough or chute, also lined with metal, the upper end of which extends past and fits against one of the inclined sides of the hopper. This trough may be made removable as a whole, as shown in the drawings, or may be permanently secured to the frame and hopper. In case it is permanently secured to the frame it must be provided with removable plates B. These removable plates B are arranged so that the upper overlap the lower sections, and are held in place by pins or hooks. By this arrangement the upper section, which becomes foul or clogged first, may be removed and cleaned without disturbing the others.

The blades b are secured to their plate by bending over the lips c c and soldering them to their support, as shown, the blade part being first passed through slits in the plates. These blades also are arranged, as shown in Fig. 2, in different planes, so that the grain to pass them must move in a zigzag course, thereby insuring the most complete cleansing.

The machine is driven or shaken by the driving-shaft D, operated by crank or pulley, as may be most convenient. The shaft carries a balance-wheel, and through its crank d and pitman d' reciprocates or shakes the hopper and trough, which are hung upon metal straps E E. A supplemental hopper may be arranged above the main hopper, if desired, and may in some instances be advantageous.

Having thus fully described my invention, what I claim as new, and desire to secure by Letters Patent, is—

1. A green-corn silker having combined with its inclined walls flat or blade-like projections, substantially as and for the purpose described.

2. The improved corn-silker described, consisting, essentially, of the combination of a hopper, a chute, removable plates armed or provided with tapering blades, and means for shaking the hopper and chute, substantially as described.

3. The combination, with the hopper having the double inclined sides, of removable plates armed with blades which intersect each other across the mouth of the hopper, as described.

4. The combination, with the trough, of a series of blade-armed plates overlapping each other, as specified.

5. The combination of a metal-lined hopper and trough and removable blade-armed plates, as herein described.

6. The combination of blades and a plate, the parts being secured together by the insertion of the former through the latter, the lips being folded over and soldered, as described.

In testimony that I claim the foregoing I affix my signature in the presence of two witnesses.

CHARLES P. BAILE.

Witnesses:
JNO. A. BUFFINGTON,
ISAAC J. SLINGLOFF.